Aug. 25, 1964 G. EVANGELISTI ETAL 3,146,346

ELECTRIC CIRCUIT FOR THE ANALYSIS OF PIPE-LINE NETWORKS FOR TRANSPORTING FLUIDS

Filed Feb. 19, 1962 4 Sheets-Sheet 1

INVENTOR

BY

ATTORNEY

Aug. 25, 1964
G. EVANGELISTI ETAL
3,146,346
ELECTRIC CIRCUIT FOR THE ANALYSIS OF PIPE-LINE NETWORKS FOR TRANSPORTING FLUIDS
Filed Feb. 19, 1962
4 Sheets-Sheet 3

INVENTOR

BY

ATTORNEY

INVENTOR

BY

ATTORNEY

United States Patent Office 3,146,346

Patented Aug. 25, 1964

3,146,346

ELECTRIC CIRCUIT FOR THE ANALYSIS OF PIPE-LINE NETWORKS FOR TRANSPORTING FLUIDS

Giuseppe Evangelisti, Giovanni Marro, Enzo Belardinelli, and Eugenio Sarti, Bologna, Alberto Grandi, San Donato Milanese, Gianpaolo Bonfiglioli, Corsico, Milan, and Rino Righetti, San Donato Milanese, Italy, assignors to Societá Nazionale Metanodotti S.p.A., Milan, Italy, a company of Italy

Filed Feb. 19, 1962, Ser. No. 174,223

Claims priority, application, Italy, Mar. 3, 1961, Patent 645,103

3 Claims. (Cl. 235—184)

This invention relates to an electric analogue circuit for analyzing pipe-line networks carrying compressible or incompressible fluids.

It is an object of the present invention to provide an electric analogue of a pipe-line network including means to adjust the characteristic parameters of the pipe-line network over the entire operating range to be encountered in practice.

It is a further object of the invention to provide an electric analogue simulating the running of a pipe-line network to which are connected fluid supply points, fluid withdrawal points and pressure control points, under steady flow and/or transient conditions.

In accordance with the present invention there is provided an automatic electric analogue circuit for simulating the operative conditions of pipe-line networks, comprising devices which provide a continuous adjustment of characteristic parameters of a pipe-line network under all conditions of the network operation.

A particular feature of the electric analogue circuit is such that the law existing between the voltages applied to its terminals and the current passing through it, is analogous to that existing between pressures at the nodal points and the fluid flow in the pipe or section of the pipe to be simulated, the law of dependency being obtained automatically by adjusting an E.M.F. in series with a fixed resistance by means of a function generator and a regulator.

It is a further feature of the invention that the electric analogue circuit may be embodied to enable an analysis of pipe-line networks in which widely different working conditions are encountered, such as pipes of various sizes, fluids of different kinds, and different conditions of the inside surfaces of the pipes.

The present invention will be more fully understood from the following description of the exemplary embodiments thereof shown in the accompanying drawings, wherein.

Figure 1:
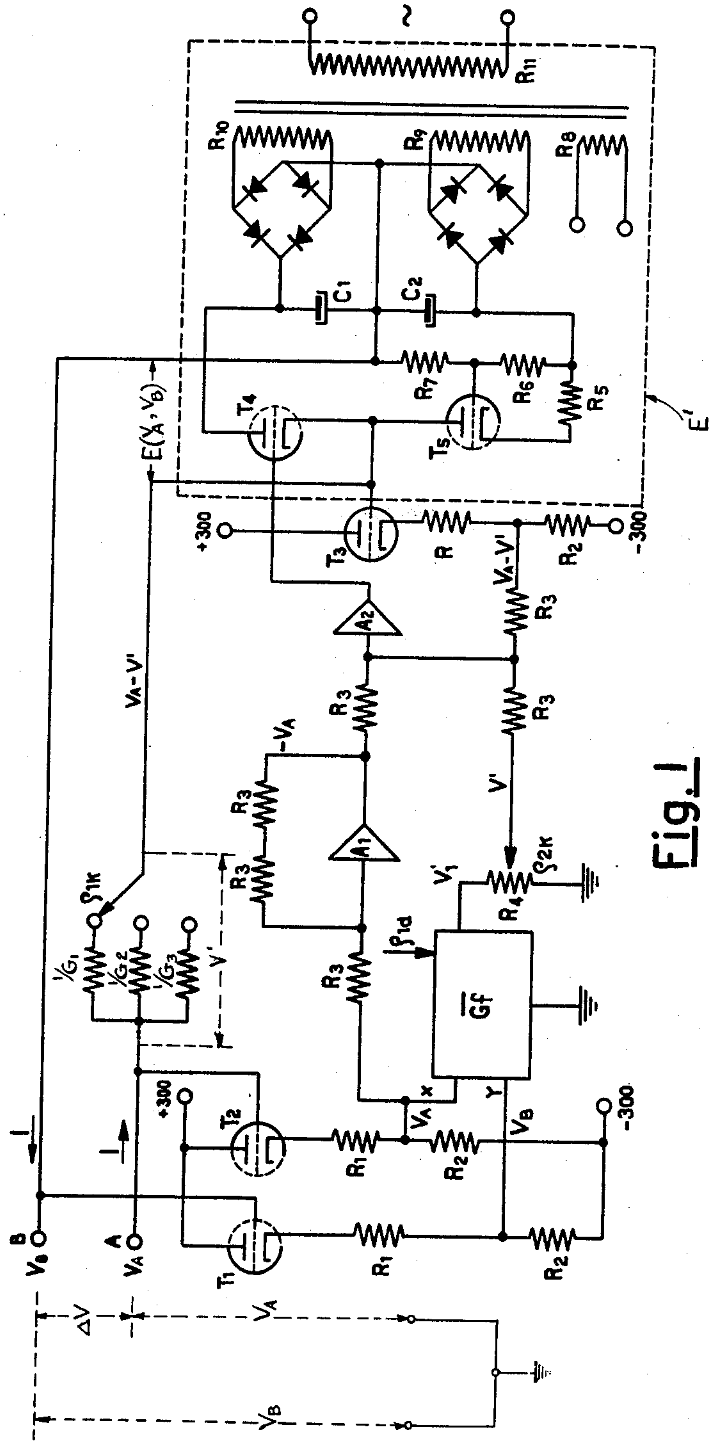
FIG. 1 is a circuit diagram of an electric analogue circuit of a pipe section.

It is known that the permanent motion of a gas in a conduit section is governed by the differential equation:

$$-\frac{1}{\gamma}dp=\frac{\lambda}{D}\frac{W^2}{2g}dx+\xi\frac{WdW}{g}$$

wherein:

$\gamma$=specific gravity of the gas $dp$=variation of pressure along the infinitesimal conduit section $dx$ $\lambda$=resistance number $D$=diameter of the pipe $W$=speed of the gas $g$=acceleration of gravity $\xi$=coefficient of the kinetic term In the above written differential equation, the first term represents the variation of total pressure along the infinitesimal pipe section $dx$, and the second term the sum of the friction losses and of the kinetic term variation. The above stated equation is valid if the gas density is independent of the height, and this is almost always the practical case.

On the other hand it is quite easy to take into account any possible height difference. Consideration of the continuity equation and of the case of isothermal transformation permits the integration of the differential equation and yields $$p_1^2-p_2^2=2\gamma_1p_1\left(\lambda\frac{L}{D}+2\xi\ \text{In}\ \frac{p_1}{p_2}\right)\frac{W_1}{2g}$$

wherein, in addition to the terms already introduced, $p_1$ represents the absolute pressure before the pipe section; $p_2$ represents the absolute pressure after the pipe section; $\gamma_1$ represents the specific gravity before the pipe section. L represents the length of the pipe section.

The logarithmic term becomes appreciable only for speeds much higher than those normally occurring in pipe-line networks, so that it can generally be neglected and the resulting error is of the order of 1%.

Hence as a very good approximation one may hold the following expression:

$$p_1^2-p_2^2=2\gamma_1p_1\lambda\frac{L}{D}\frac{W_1^2}{2g}$$

It appears to be convenient to introduce in the preceding equation the pressure drop $\Delta p$ between the nodes of the conduit section and to refer to a state N which, usually, corresponds to the atmospheric pressure and to the ambient temperature; consequently $p_N$, $\gamma_N$ $W_N$ and $Q_N$ indicate respectively the values of pressure, specific gravity, speed and flow of the gas under the above said conditions. The resistance number $\lambda$ satisfies the equation $$\frac{1}{\sqrt{\lambda}}=-2\ \lg_{10}\left(\frac{2.51}{n\sqrt{\lambda}}+\frac{1}{3.72}\cdot\frac{\epsilon}{D}\right)$$

$\epsilon$=roughness of the pipe. In view of the electric simulation of the pipeline network $\lambda$ is calculated by means of the expression:

$$\lambda=\frac{\lambda_o}{n_0\beta}\cdot n^\beta$$

which is an approximated formulation of the above mentioned expression which $\lambda$ satisfies. If the diameter D of the conduit is constant, one may write:

$$\lambda=\lambda_0\frac{W^\beta}{W_0^\beta}=\lambda_0\frac{Q^\beta}{Q_0^\beta}$$

wherein:

$$\beta=\frac{n_0}{\lambda_0}\left[\frac{d\lambda}{d_n}\right]_0$$

in practice represents the tangent, at the point $(n_0, \lambda_0)$, to the curve represented by the actual expression of $\lambda$. $\lambda_0$ is the value assumed by the resistance number $\lambda$ for a particular value $n_0$ of Reynolds number. $\beta$ is the exponent of Reynolds number in the approximate expression of the resistance number.

By appropriate substitutions, the gas flow may be represented as follows:

$$p_1-p_2=\Delta p=\frac{2p_n}{p_1+p_2}\gamma_n\lambda\frac{L}{D}\frac{W_n^2}{2g}=\frac{2p_n}{p_1+p_2}\gamma_n\frac{16}{\pi 2}\frac{\lambda}{2g}\frac{L}{D_5}Q_n^2$$

or shortly by:

$$(1')\qquad p_1-p_2=\Delta p=\frac{2p_N}{p_1+p_2}K_0\cdot Q_N^{\alpha}$$

wherein $$K=\frac{16}{\pi 2}\gamma_N\frac{L}{2g}\frac{1}{D^5}\frac{\lambda_0}{Q_0^{\beta}},\alpha=2+\beta$$

The above mentioned matter has been treated with the greatest generality, as far as the fluid compressibility is concerned. When it is possible to neglect the fluid compressibility, e.g., as in the case of liquids or of low pressure gases, an analogous calculation leads to the expression:

$$p_1-p_2=\Delta p=K'Q^{\alpha}\qquad (2')$$

The analogy between the elements of a pipeline network and the elements of the electric network is based on the correspondence between fluid pressures and voltages on the one hand and fluid flows and currents on the other.

This leads to the following equations:

(*a*) For fluids to be considered incompressible (liquids or low pressure gases)

$$V_A-V_B=\Delta_V=KI^{\alpha}\qquad (1)$$

(*b*) For compressible fluids (gases at high pressure)

$$V_A-V_B=\Delta_V=\frac{V_n}{V_m}KI^{\alpha}\qquad (2)$$

wherein:

$\Delta V$=difference of potential at the terminals of the electric network $V_m$=average potential of the electrical network (arithmetical average of the voltages at the terminals) with respect to the level of reference corresponding to zero absolute pressure $V_N$=potential corresponding in the scales selected for the analogy at atmospheric pressure For determining the parameter K, if the representation scales of the analogue circuit are such that:

$$1A\equiv S_q\text{ m.}^3\text{/sec.}$$

$$1V\equiv S_p\text{ kg./cm.}^2$$

1 sec. analogue$\equiv s_t$ sec. original, we use the formula $$K=\frac{S_q^{\alpha}}{S_p}K'$$

The electric analogue circuit of the present invention reproduces the Equations 1 and 2 and allows adjusting with continuity the parameters K and $\alpha$ at the beginning of the run in order that each electrical analogue element simulates the features of the corresponding pipeline section.

In the circuit diagram of the electric analogue network shown in FIG. 1, which is adapted to solve substantially all practical design problems of a pipe section, the circuit comprises substantially a resistance $$\frac{1}{G_1}$$

and a source E′ of E.M.F. which is automatically varied. The embodiment of the law of dependency between voltage, ΔV and current is effected by means of a function generator G*f* and by the computer circuit consisting of the operational amplifiers $A_1$ and $A_2$ and of the cathode followers $T_1$, $T_2$ and $T_3$.

The equation that defines the operation of the regulator of FIG. 1 is:

$$E(V_A,V_B)=V'(V_A,V_B)-\Delta V=V'(V_A,V_B)-V_A+V_B$$

where $V_A$ and $V_B$ represent respectively the voltages at the terminals A and B of the electric network and V represents the voltage drop in the resistance $$\frac{1}{G}$$

In the two cases corresponding to Equations 1 and 2 we have $$V'=\frac{I}{G}=\frac{I}{G}\frac{1}{K^{1/\alpha}}(\Delta V)^{1/\alpha}=\frac{1}{G}\frac{1}{K^{1/\alpha}}(VA-VB)^{1/\alpha}\qquad (3)$$

$$V'=\frac{I}{G}=\frac{1}{G}\frac{1}{(KV_N)^{1/\alpha}}(\Delta V-Vm)^{1/\alpha}$$

$$=\frac{1}{G}\frac{1}{(2KV_N)^{1/\alpha}}[(V_A-V_B)(V_A+V_B)]^{1/\alpha}$$

The system affords the advantage of the possibility of adjusting with continuity the value of the parameter K without intervening on the regulator: in fact it suffices to modify the value of the resistance $$\frac{1}{G}$$

to vary the current absorption, the value of the applied voltage remaining the same.

With reference to FIG. 1, the cathode followers $T_1$ and $T_2$ are connected to the input of the function generator $G_f$ to reduce the currents absorbed by said function generator from terminals A and B. The computer circuit is formed by the operational amplifier $A_1$ providing the inversion of the signal $V_A$, the cathode follower $T_3$, whose task is to reduce the current absorbed by the computer circuit from the terminal common to the E.M.F. generator E′ and to the group of resistances $1/G_1$, $1/G_2$, $1/G_3$, the operational amplifier $A_2$ which sums up the signals $V_A$ and $V'_1$ with the signal coming from the cathode follower $T_3$. The E.M.F. generator E′ is represented in FIG. 1 by the part of the circuit enclosed in the rectangle drawn in dotted lines. This generator E′, which is insulated from ground, is formed by an input transformer, by two rectifier circuits with leveling condensers $C_1$ and $C_2$, and by an assembly comprising two electronic tubes $T_4$ and $T_5$ disposed as to constitute a cathode follower circuit. The E.M.F. generator E′ is in series with the resistances $1/G_1$, $1/G_2$, $1/G_3$, and is piloted through the tube $T_4$ by the output of the amplifier $A_2$. The amplifier $A_2$ is a high gain amplifier, with which the sum of the input voltages must be practically nil. The voltage of the input terminal in the cathode follower $T_3$ must therefore annul the sum of the voltages V′ and $V_A$, namely, must be equal to $V_A-V'$. From what we have said, it follows that the voltage drop on the resistances $1/G_1$, $1/G_2$, $1/G_3$ is $V_A-(V_A-V')=V'$, and therefore is equal to the output signal from the function generator $G_f$, while the current I, circulating in the resistances in series with the E.M.F. generator E′ is equal to GV′ and satisfies the Equations 1 and 2. The simulation of elements of pipelines having different values of the parameter K is made possible when the different resistances $1/G_1$, $1/G_2$, $1/G_3$ are connected to the circuit by means of a selector switch.

The function generator, represented by the block $\overline{G}_f$ of FIG. 1, has the task of supplying a voltage $V'_1V'$, being functions of the voltages $V_A$ and $V_B$, according to the laws (3) and (4).

Two different kinds of function generator $\overline{G}_f$ will now be described.

The first kind of function generator $\overline{G}_f$ as employed in the most common cases, such as for instance those of pipeline networks passed through by high pressure natural gas, wherein K is variable within wide limits, depending on the diameter and on the length of the conduit, while $\alpha$ is constant and adjustable by finite grades within a restricted range.

Figures 2, 3:
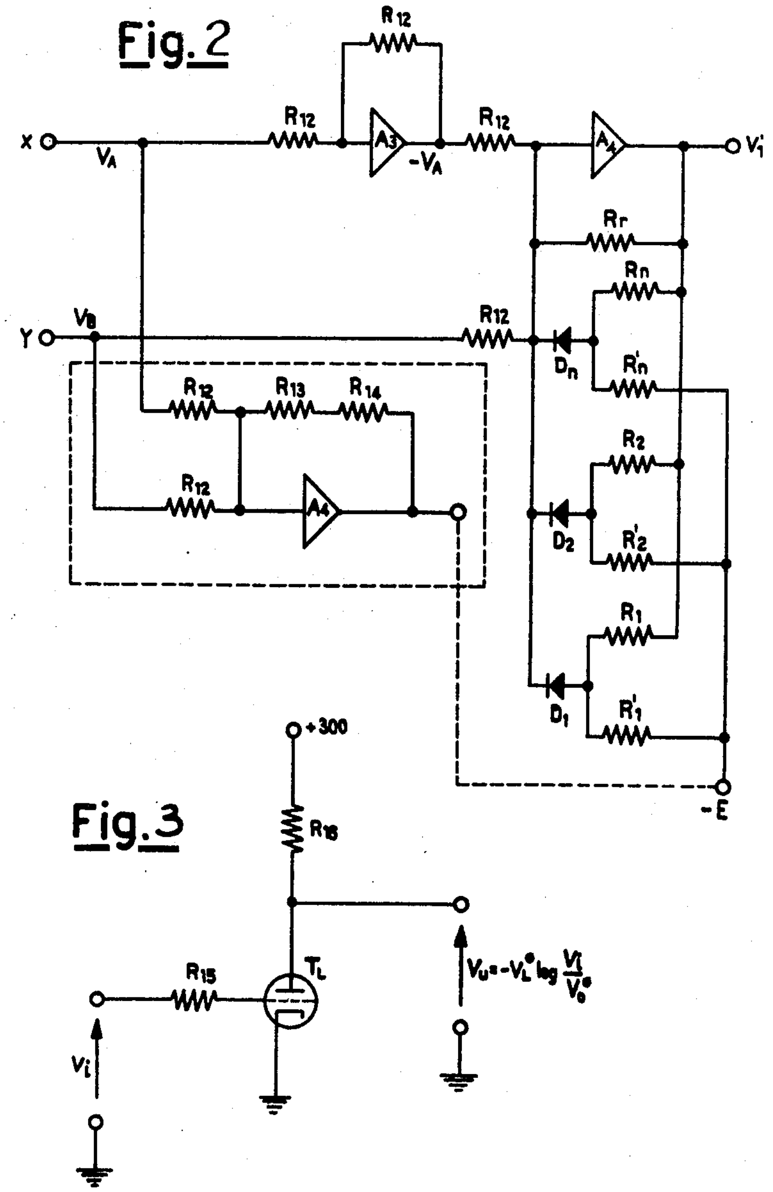
FIG. 2 shows a first type of function generator used in the circuit of FIG. 1.
FIG. 3 shows one form of logarithmic element which may be employed in a second type of function generator which may be used in the circuit of FIG. 1.

A function generator $\overline{G}_f$ of this type is shown in FIG. 2. The limitation of the adjustment of $\alpha$ permits a considerable circuit simplicity and ensures a high stability with consequent minimal drift.

The operational amplifier $A_3$ provides the inversion of the signal $V_A$. The output signal $-V_A$ from amplifier $A_3$, is summed with the signal $V_B$ in the operational amplifier C having a variable resistance reaction circuit.

The diodes $D_1, D_2 \ldots D_n$ which are in the feedback circuit of the operational amplifier C successively begin to become conductors the greater the output voltage $V'_1$ and reduce gradually assembly gain. The diode's bias voltage is fixed and has a negative value $-E'$ when Equation 3 has to be realized and is variable proportionally to the average voltage with negative sign $-Vm$ when Equation 4 has to be realized; the part of circuit enclosed by a dotted line serves only in this second case. Said circuit is formed by the operational amplifier $A_4$, which sums the signals $V_A$ and $V_B$, in order to obtain an output signal proportional to the average value $V_m=(V_A+V_B)/2$. The circuit of FIG. 2 does not allow a continuous adjustment of the exponent $\alpha$; when a discontinuous adjustment is sufficient, it is possible to modify, with a special switch (not shown), the values of the resistances present in the feedback circuit.

The adjustment of the coefficient K is obtained, the value of $\alpha$ remaining unaffected, by varying conveniently the value of the resistance $$\frac{1}{G}$$

or by attenuating to a variable extent the output voltage of the function generator; it is convenient to employ both types of adjustment, the first one ($\xi$1K of FIG. 1) for a discontinuous variation, the second one ($\xi$2K of FIG. 1) for a fine adjustment.

The electric network of FIG. 1 having as terminals A and B, is evidently unidirectional; to obtain the analogue of pipe sections transporting fluids in both directions, it is necessary to connect before the terminals an electronic diode switch of the Graetz bridge type, or to duplicate the electric network with blocking diodes.

The second kind of function generator $\overline{G}_f$ is employed in the more general case in which both parameters K and $\alpha$ have to be varied continuously; this occurs in particular for analyzing pipeline networks passed through by liquids having high viscosity; in fact in this case $\alpha$ is subject to considerable variations, since the viscosity of the liquid transported may assume highly different values in dependence upon the temperature and the liquid composition. This type of function generator makes use of a computing scheme that operates by passing over to logarithms, carrying out with them simple arithmetic computations such as summing or multiplication by a constant and then returning to the numbers. The application of this computing scheme with electric variables involves the well-known difficulties connected with the use of nonlinear operators; however, the accuracy required in the reproduction of the fundamental equations, which of course cannot be higher than the degree of accuracy of the phenomenon represented, is not relatively high.

This type of function generator uses simple calculating circuits and permits the realization of electric analogue circuits of pipeline networks having characteristics of functionality and flexibility of use such as are not found with circuits already in use.

A logarithmic element as may be employed in this type of function generator is shown in FIG. 3. A triode $T_L$ having cathode and grid connected diodelike provides the logarithmic relation between grid current and grid voltage: the variations of grid voltage are amplified by the same tube, so that a logarithmic dependecy is obtained between the grid current and the voltage drop in the plate load resistor; the signal applied to the grid is a current-signal, since the grid potential is negligible with respect to the input voltage $V_i$.

The output voltage $V_u$ is expressed by the relation:

$$V_u=-V_L{}^* \log \frac{V_i}{V_o{}^*}$$

wherein $V^*_L$ and $V^*_o$ are constants which depend on the tube and vary considerably also for tubes having the same mark; anyhow they may always be reduced to predetermined values by suitable adjustments of the linear parameters of the circuit.

Further $V^*_L$ and $V^*_o$ are functions of the variations of the tube heater voltage and of the modifications of the cathode surface.

Figure 4:
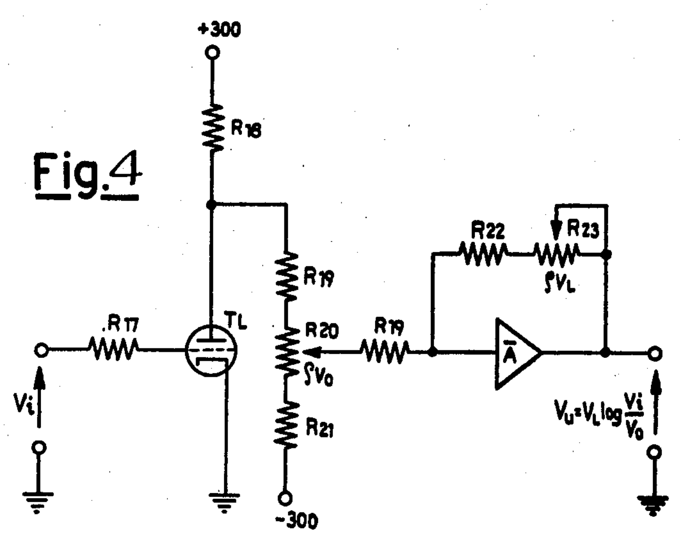
FIG. 4 shows a modified form of the element of FIG. 3.

To avoid effects due to the above variations and in view of the necessity of making the range of variability of the output voltage $V_u$ coincide with the range of optimum operation of normal computing circuits, the logarithmic element shown in FIG. 4 providing for the adjustments of $V^*_L$ and $V^*_o$ (in the figures $\xi V_L$ and $\xi V_o$ respectively), is to be preferred. The circuit of FIG. 4 comprises the logarithmic circuit of FIG. 3 to the output of which is connected the operational amplifier, the gain of which may be varied by the two potentiometers $R_{20}$ and $R_{23}$. With reference to FIG. 4, we have $$V_u=V_L \log \frac{V_i}{V_o} \quad (5)$$

where now $V_L$ and $V_o$ assume values which are no longer dependent on the characteristic of the triode, but are arbitrarily established.

Figure 5:
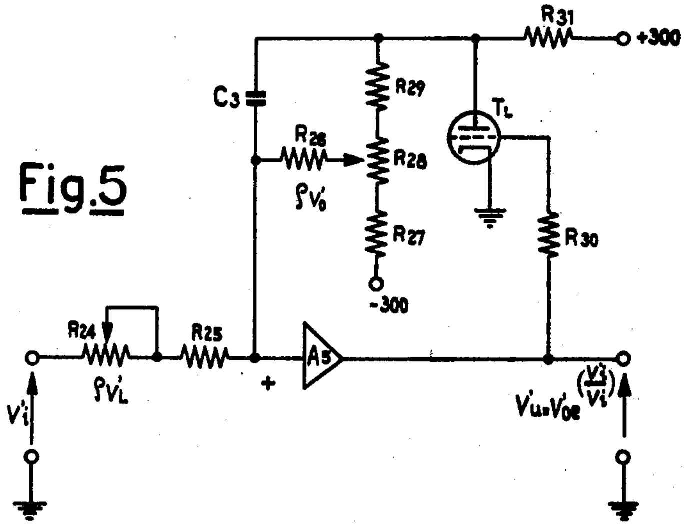
FIG. 5 shows an exponential element which may be employed in the second type of function generator.

The exponential element shown in FIG. 5 is constituted by a logarithmic element $T_L$, of the type of FIG. 3, connected on the feedback of a high gain amplifier A5; since the gain of the amplifier is much higher than unity, we have:

$$V_i'=V_L' \lg \frac{V_u'}{V_o'}$$

and $$V_u'=V_o' \exp\left(\frac{V_i'}{V'_L}\right) \quad (6)$$

If the circuit is designed such that $V_L=V'_L$, $V_o=V'_o$, the preceding relationship is made to become representative of the inverted function of Equation 5. By means of the potentiometers $R_{24}$ and $R_{26}$ (FIG. 5), $V'_L$ and $V'_o$ respectively may be varied. By employing logarithmic and exponential elements of the above described type, the functions (3) and (4) are generated electrically with the possibility of continuous adjustment of $\alpha$.

Figure 6:
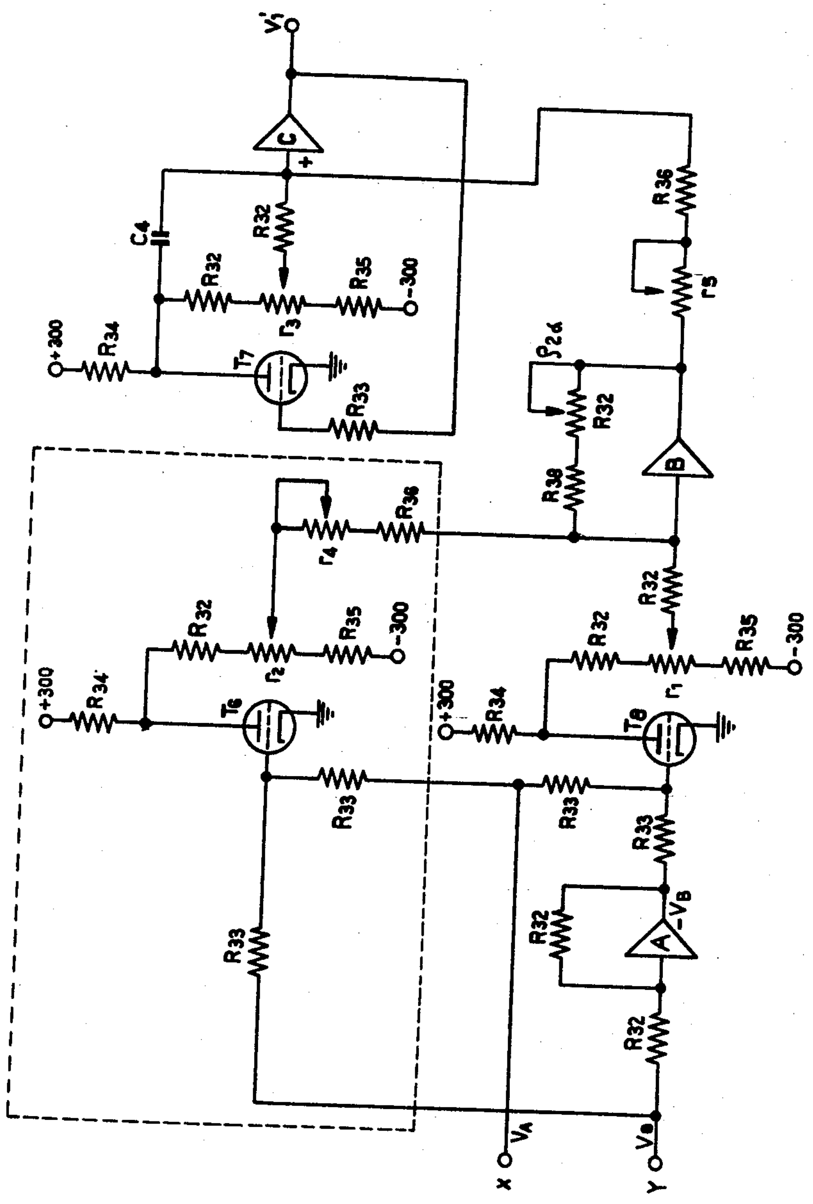
FIG. 6 is a circuit diagram of the second type of function generator, based on FIGS. 3–5.

FIG. 6 is a complete circuit diagram of the function generator $\overline{G}_f$ which carries out the aforesaid operations: the circuit comprises two logarithmic elements $T_6$ and $T_8$ at the input of which are present, respectively, the currents $(V_A+V_B)/R_{33}$ and $(V_A-V_B)/R_{33}$; the output signals by means of the operational amplifier B are summed, divided by the constant $\alpha$ and then taken to the input of the exponential amplifier C presenting in the feed back circuit the tube $T_7$, at the output whereof the desired function is obtained directly. The adjustment of the exponent of the Equations 1 and 2 is effected by adjusting the potentiometer $R_{32}$ shown in FIG. 6.

Suitable values may be selected for potentiometers $r_1$, $r_2$, $r_3$, $r_4$ and $r_5$ (FIG. 6), to compensate any diversity of the tube characteristics. The part of the circuit enclosed by a dotted line in FIG. 6 is omitted if generation of the simpler relation 3 is wanted.

The above-mentioned non-linear resistors may be connected among them and with other circuit elements in order to form an electrical network simulating a pipeline network. The other circuit elements are chiefly the following: feed sources connected at nodes of the electrical network and simulating input of the fluid into the pipeline network; loads connected at nodes of the electrical network and simulating output of the pipeline network; and booster transformers interposed between two nonlinear resistors and simulating the compression stations. The electrical network may present other circuit elements simulating every other device pertaining to a pipeline network.

Though the present invention has been described in correlation with determined embodiments as illustrated in the drawings, it is susceptible of numerous other applications as will be apparent to the specialists. Moreover, without departing from the spirit and scope of the invention, many variants and additions may be made in putting the present invention into practice.

Having thus described our invention, what we claim is:

1. An electric circuit for simulating fluid-conducting conduits, said circuit having two terminals and comprising (*a*) an operational adding amplifier (*b*) an inverter amplifier (*c*) a linear resistance adjustable to represent different conduits, said resistance being connected in series with a source of variable electromotive force consisting of (*d*) a cathode follower circuit fed by a feeder insulated from ground, said cathode follower circuit being piloted by (*e*) a computer circuit comprising a function generator whose output is connected to one of the inputs of said operational adding amplifier, the other input of said adding amplifier being connected to said inverter amplifier, thereby to cause the current circulating between the two terminals of the electric circuit to depend upon the voltages applied at said two terminals in analogy to the dependency existing between the pressure at the ends of a conduit being simulated and the rate of flow of fluid passing through said conduit.

2. An electric circuit according to claim 1, wherein the function generator comprises (*a*) a high-gain amplifier with a non-linear feedback network constituted by several branches connected in parallel, each of said branches including a diode and and a resistor in series, and a summing circuit is provided, and said network is biased by a voltage, furnished by said summing circuit, proportional to the average of the voltages applied at said two terminals of the simulating circuit, and said high-gain amplifier has its input connected through a resistor to one of the terminals of the electrical simulating circuit and through an inverter amplifier to the other terminal of said simulating circuit.

3. An electric circuit according to claim 1, wherein the function generator comprises (*a*) a logarithmic amplifier consisting of two logarithmic elements to which is applied, respectively, a voltage proportional to the sum and a voltage proportional to the difference of the voltage applied at the two terminals of the simulating circuit and delivering an output voltage proportional to the logarithm of the two said voltages, and (*b*) means is provided for summing said output voltage dividing it by a constant and then conducting it to the input of (*c*) an exponential amplifier.

References Cited in the file of this patent

UNITED STATES PATENTS

| | | |
|---|---|---|
| 2,695,750 | Kayan | Nov. 30, 1954 |
| 2,786,629 | Piety | Mar. 26, 1957 |
| 2,871,374 | Early | Jan. 27, 1959 |

FOREIGN PATENTS

| | | |
|---|---|---|
| 877,608 | Great Britain | Sept. 13, 1961 |

OTHER REFERENCES

Karplus, "The Use of Electronic Analogue Computers With Resistance Network Analogues," British Journal of Applied Physics vol. 6, No. 10, October 1955.